United States Patent [19]
Kirschbaum

[11] Patent Number: 5,148,772
[45] Date of Patent: Sep. 22, 1992

[54] METHOD AND APPARATUS FOR ELECTRICALLY INHIBITING BACTERIA GROWTH IN AQUARIUMS

[76] Inventor: Robert N. Kirschbaum, 7036 S. Spruce Dr. West, Englewood, Colo. 80112

[21] Appl. No.: 638,095

[22] Filed: Jan. 7, 1991

[51] Int. Cl.$^5$ .............................................. A01K 63/04
[52] U.S. Cl. ......................................... 119/5; 210/243
[58] Field of Search ...................... 119/5, 3; 204/149; 210/243

[56] References Cited

U.S. PATENT DOCUMENTS

| | | | |
|---|---|---|---|
| 3,752,747 | 8/1973 | Treharne et al. | 204/149 |
| 3,891,535 | 6/1975 | Wikey | 204/149 |
| 4,257,352 | 3/1981 | Habegger | 119/5 |
| 4,719,018 | 1/1988 | Przybylski | 210/243 |
| 4,769,119 | 9/1988 | Grundler | 204/149 |

FOREIGN PATENT DOCUMENTS

| | | | |
|---|---|---|---|
| 0351357 | 1/1990 | European Pat. Off. | 119/3 |
| 1026732 | 7/1983 | U.S.S.R. | 119/3 |

OTHER PUBLICATIONS

Dr. Chris Andrews, *A Fishkeeper's Guide to Fish Breeding*, pg. 34 (1986).

Primary Examiner—Robert P. Swiatek
Assistant Examiner—Todd E. Manahan
Attorney, Agent, or Firm—Reinhart, Boerner, Van Deuren, Norris & Rieselbach, s.c.

[57] ABSTRACT

An apparatus for inhibiting bacteria growth and reproduction in an aquarium containing water and aquatic organisms such as fish, includes at least one positive and one negative electrode connected to a D.C. power source operative to produce electric power in the range of about 1.5 to 3.0 volts and about 0.1 to 10 milliamperes. The electrodes are disposed in spaced relation within the aquarium, and are at least partially immersed in the water. The positive electrode is formed from galvanized wire or zinc wire, and the negative electrode is formed from galvanized wire. The electric potential between the electrodes is effective to inhibit the reproduction of bacteria which is detrimental to fish, humans and water clarity. In larger aquariums, a plurality of pairs of positive and negative electrodes are spaced in alternating sequence within the aquarium to maintain an electric potential throughout the aquarium effective to inhibit bacteria reproduction.

9 Claims, 2 Drawing Sheets

METHOD AND APPARATUS FOR ELECTRICALLY INHIBITING BACTERIA GROWTH IN AQUARIUMS

BACKGROUND OF THE INVENTION

The present invention relates to aquariums, and more particularly pertains to a method and apparatus for inhibiting reproduction of harmful bacterial in the water of the aquarium, without harming aquatic organisms, such as fish. Typically, aquariums contain fish or other aquatic organisms, water, various organic materials, and at least two types of bacteria. A first type of bacteria "feeds" on organic materials such as the fecal matter of fish, fish food, portions of aquatic plants, etc. As a by product of this bacterial action, ammonia is produced, along with small particles of residue which cloud the aquarium water, and produce a rancid odor. Ammonia, in sufficient concentration in the aquarium water, can kill the fish.

A second type of bacteria normally present in aquariums is beneficial, because it "feeds on" ammonia, thus reducing the potentially toxic ammonia concentration in the aquarium water. However, the first harmful type of bacteria can multiply very rapidly, especially when excess organic material is introduced into the aquarium water. Such excess can occur through excess feeding, the death of a fish or aquatic plant, or the addition of fish to the aquarium. As a result, the harmful bacteria reproduce rapidly, producing ammonia at a rate much greater than the beneficial bacteria can consume the ammonia. When the ammonia reaches a sufficient concentration, a large number of expensive fish can be quickly killed. In order to avoid this cycle, it has been necessary, prior to the present invention, to introduce new fish into an aquarium one at a time, over a protracted time period, so that a balance between the ammonia producing bacteria and the ammonia consuming bacteria can be maintained.

In addition to the ammonia produced by the action of bacteria on organic matter, fish urine is an additional source of ammonia. Conventional activated charcoal water filters have been employed to reduce the ammonia concentration, but these filters are expensive and must be frequently changed and maintained.

Other types of bacteria found in aquarium water can produce disease in both fish and humans. Individuals who work in the field of aquarium service and cleaning are particularly susceptible to such diseases.

If reproduction of the bacteria is inhibited, then decay of organic matter will be slowed, reducing the spread of disease, cloudiness of the water will be minimized, and a relatively small number of ammonia consuming bacteria will still be adequate to prevent the ammonia from reaching a toxic concentration.

SUMMARY OF THE INVENTION

In order to achieve these and other objects of the invention, the present invention provides an apparatus for inhibiting bacteria reproduction in an aquarium containing water and aquatic organisms such as fish, which includes at least one positive and one negative electrode connected to a D.C. power source operative to produce electric power in the range of about 1.5 to 3.0 volts and an electric current about 0.01 to 10 milliamperes. The electrodes are disposed in spaced relation within the aquarium, and are at least partially immersed in the water. The positive electrode is formed from galvanized wire or zinc wire, and the negative electrode is formed from galvanized wire. The electric potential between the electrodes is effective to inhibit the reproduction of bacteria which is detrimental to fish, humans and water clarity. In larger aquariums, a plurality of pairs of positive and negative electrodes are spaced in alternating sequence within the aquarium, to maintain an electric potential throughout the aquarium effective to inhibit bacteria reproduction.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT(S)

Figure 1:
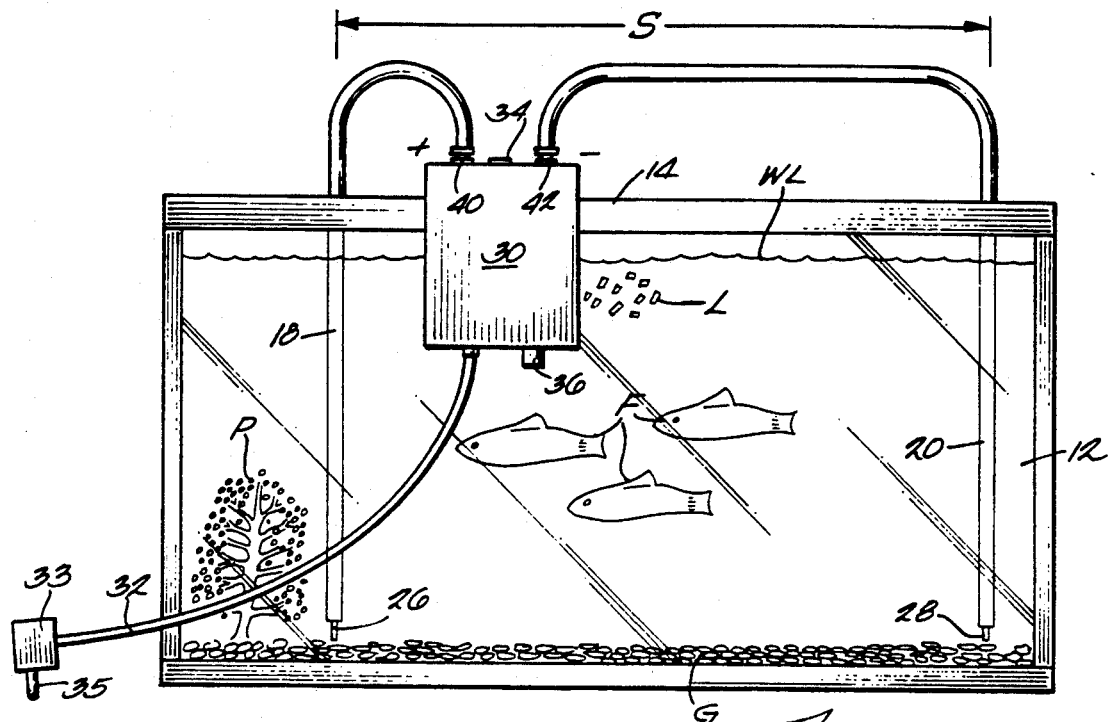
FIG. 1 is front elevational view of the bacteria inhibiting apparatus according to a first embodiment of the present invention in use with an aquarium.

Referring now to the drawings, wherein like reference numerals designate corresponding structure throughout the views, and referring in particular to FIG. 1, an apparatus 10 according to a first embodiment of the present invention, is installed in a conventional aquarium 12, for electrically inhibiting bacteria growth and reproduction therein. The aquarium 12 is filled with water to a level WL, and has a floor formed by a fine grade of gravel G. The aquarium 12 may contain aquatic plants P, fish food flakes L and aquatic organisms such as fish F.

Figure 2:
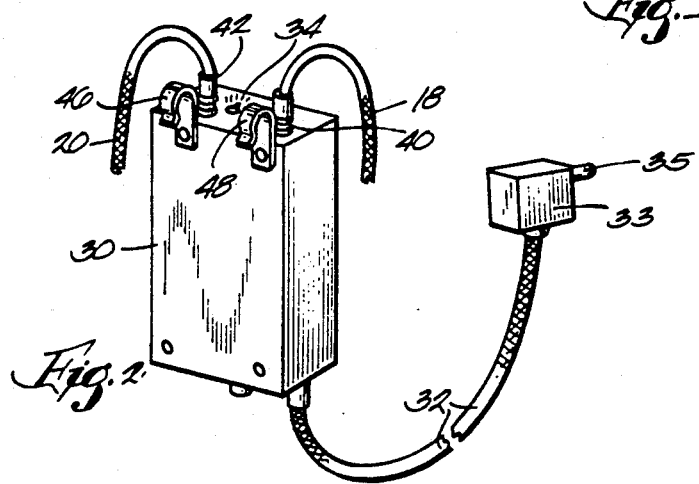
FIG. 2 is a perspective view illustrating the electrical bacteria inhibiting device of FIG. 1.

A pair of clamps 46 and 48 on control unit 30 (FIG. 2) engage the top rim 14 of the aquarium 12, and function to suspend the control unit 30 on an outside wall of the aquarium 12. Electrodes 18 and 20 are connected, respectively, to positive terminal 40 and negative terminal 42 of the control unit 30 spaced apart by a distance S. The electrodes 18 and 20 are formed from a relatively stiff wire, such that they will hold a deformed shape, and thus may be positioned adjacent opposite ends of the aquarium, in an at least partially immersed condition beneath the water line WL.

The positive electrode 18 is preferably formed from an insulated galvanized or zinc wire, and has an exposed metal tip portion 26 having a length of 0.25 inch per each 10 gallons of water in the aquarium, with a minimum exposed length of 0.5 inch. The negative electrode 20 is preferably formed from an insulated galvanized wire, and has an exposed metal tip portion 28 having a length of 0.1 inch per inch of fish in a new tank, and 0.05 inch per inch of fish in an established tank. In other words, the total length of all fish in the tank, in inches, is multiplied by 0.1 in a newly set up tank, and by 0.05 in an established tank, to calculate the length of the exposed tip 28.

The control unit 30 is connected by a cord 32 to a transformer 33 having prongs 35 for connection to a conventional 120 V.A.C. electric outlet. The transformer 33 may have output specifications of 3.6 VDC and 200 ma. The control unit 30 produces a relatively low current, in the range of 0.1 to 10 milliamperes, at a voltage in the range of 0.1 to 3.0 VDC. For freshwater aquariums, the preferred values are 1.5 VDC and 0.4 to 0.6 ma. For saltwater aquariums the preferred values are 0.4 VDC and 2.6 ma. As shown in the schematic diagram of the control unit 30 depicted in FIG. 5, the 3.6 VDC input to the control unit 30 is supplied by the transformer 33. The capacitor C has a value of 0.1 microfarad at 100 volts. The LM317 voltage regulator is a standard item and is available from a variety of sources, for example Texas Instruments. The control unit 30 includes a fuse 36 and a "power on" indicating LED 34, shown in FIGS. 1 and 2.

Figure 5:
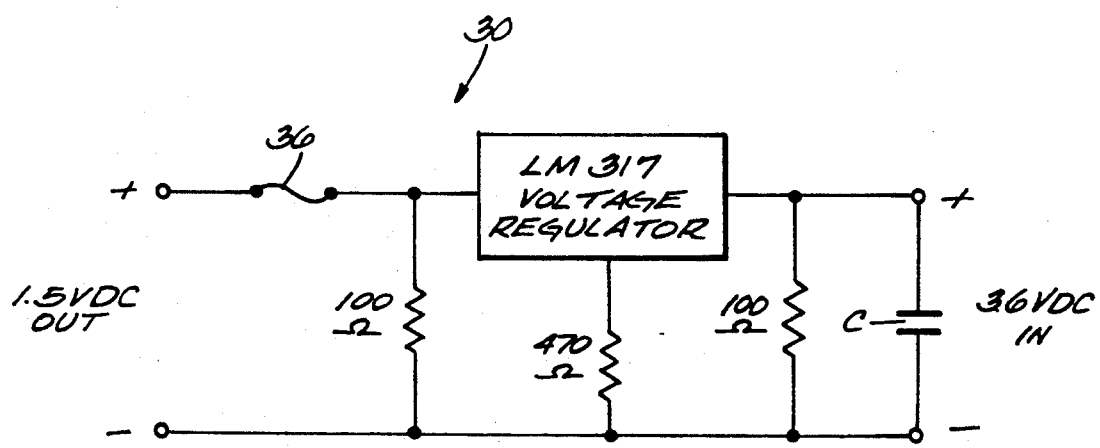
FIG. 5 is a schematic diagram illustrating the electrical components of the present invention.

As illustrated in FIG. 5, the LM 317 voltage regulator is a three terminal device that, in known manner, provides a substantially constant voltage at its output. The particular voltage supplied by the voltage regulator is determined in accordance with the relative values of the three external bias resistors shown in FIG. 5. The applications of LM 317 voltage regulators are well known in the art, and the particular structural details of the voltage supply are not critical.

Figure 3:
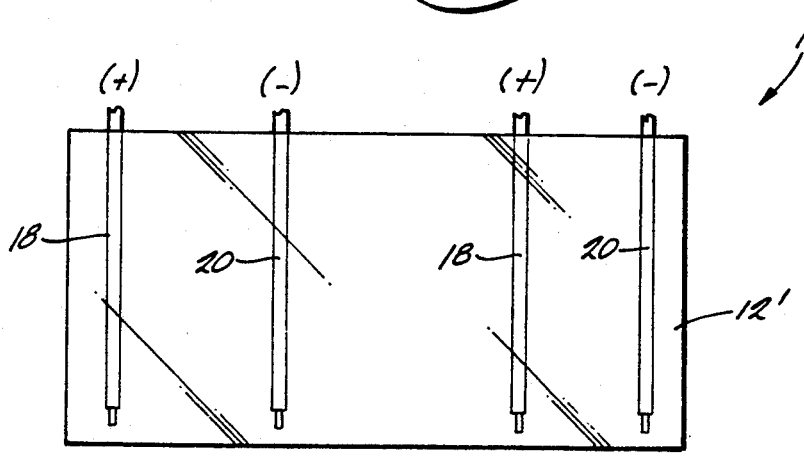
FIG. 3 is a diagrammatic side elevational view illustrating a second embodiment of the invention, in which a plurality of pairs of electrodes are spaced evenly within a large aquarium.

For use with larger aquariums 12', such as that shown in FIG. 3, the bacterial inhibiting apparatus 10' according to the second embodiment of the invention includes a plurality of pairs of positive 18 and negative 20 electrodes disposed in evenly spaced, alternating sequence. A suitable power supply maintains an electric potential between each adjacent pair of positive 18 and negative 20 electrodes of about 1.5 VDC for aquariums smaller than 50 gallons, and about 3.0 VDC for aquariums larger than 55 gallons, with a current in the range of about 0.1 to 10 milliamperes per pair of electrodes.

Figure 4:
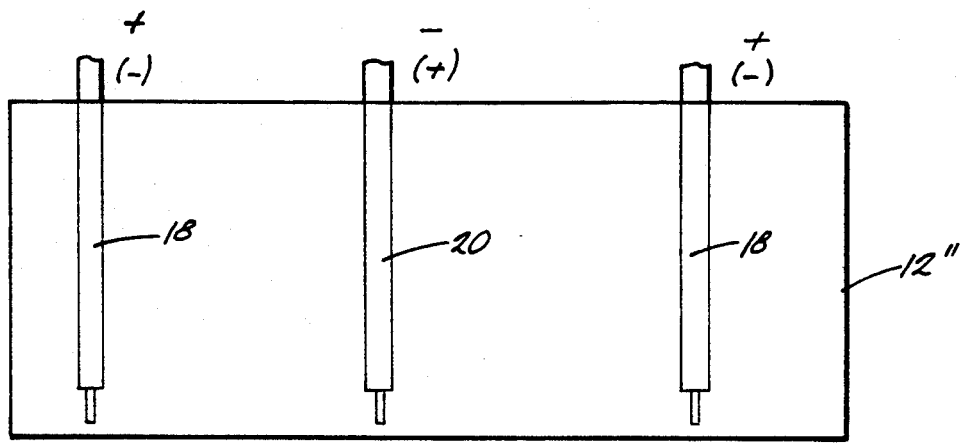
FIG. 4 is a diagrammatic side elevational view illustrating a third embodiment of the invention, in which an odd number of electrodes are spaced in alternating sequence in an aquarium.

As shown in FIG. 4, in accordance with a third embodiment 10" of the invention, the electrodes may be arranged in alternating sequence such that there are an even number of one polarity of electrodes, and an odd number of the opposite polarity of electrodes.

When the bacteria inhibiting apparatus and method according to the present invention is employed, the need for an activated charcoal filter is obviated, along with the associated tedious maintenance. The interval between required aquarium water changes is also greatly increased, to about once a year. The only required maintenance of the bacteria inhibiting apparatus is the occasional (once a week) cleaning of the electrode tips 26 and 28. Alternatively, a new electrode tip wire portion may be exposed by cutting off the old tip and stripping an appropriate length of insulation.

It is to be understood, however, that even though numerous characteristics and advantages of the present invention have been set forth in the foregoing description, together with details of the structure and function of the invention, the disclosure is illustrative only, and changes may be made in detail, especially in matters of materials, shape, size and arrangement of parts within the principles of the invention to the full extent indicated by the broad general meaning of the terms in which the appended claims are expressed.

What is claimed is:

1. An apparatus in combination with an aquarium having a sand or gravel floor for inhibiting reproduction of anaerobic bacteria in said aquarium, said apparatus comprising:

a first electrode having an exposed surface;
means for supporting said exposed surface of said first electrode adjacent the floor of the aquarium;
a second electrode having an exposed surface;
means for supporting said exposed surface of said second electrode adjacent the floor of the aquarium at a position spaced laterally from said first electrode; and
a voltage source connected to said first and second electrode for establishing a steady electrical potential between said first and second electrodes, said steady electrical potential being in the range of 0.1 to 3.0 volts;
said exposed surfaces of said first and second electrodes being dimensioned so as to provide a direct current between said first and second electrodes in the range of 0.1 to 10 milliamperes;
said direct current passing adjacent the floor of the aquarium to inhibit the reproduction of anaerobic bacteria growing adjacent thereto while avoiding inhibition of the reproduction of aerobic bacteria growing adjacent thereto.

2. An apparatus as defined in claim 1 wherein the aquarium contains saltwater and wherein said direct current between said first and second electrodes is substantially 2.6 milliamperes.

3. An apparatus as defined in claim 1 wherein the aquarium contains fresh water and wherein said direct current between said first and second electrodes is in the range of substantially 0.4 to 0.6 milliamperes.

4. An apparatus as defined in claim 1 wherein said first and second electrodes each comprise a segment of insulated wire having an exposed tip, said means for supporting said first and second electrodes comprising the insulated portions of each of said wires.

5. An apparatus as defined in claim 4 wherein the length of each of said exposed tips is between 2.5% and 10% of the total length of all the fish to be maintained in the aquarium.

6. An apparatus as defined in claim 5 wherein said first electrode is connected to the positive polarity output of said voltage source and is formed of zinc wire.

7. An apparatus as defined in claim 6 wherein said second electrode is connected to the negative polarity terminal of said voltage source and is formed of galvanized wire.

8. An apparatus as defined in claim 6 wherein said second electrode is connected to the negative polarity terminal of said voltage source and is formed of zinc wire.

9. An apparatus as defined in claim 1 further comprising an additional electrode positioned adjacent the floor of the aquarium and spaced from said first and second electrodes, said additional electrode having the same polarity as said first electrode so that current flows between said second electrode and each of said first and additional electrodes.

* * * * *